United States Patent [19]

Chomet et al.

[11] 3,781,468

[45] Dec. 25, 1973

[54] TELEVISION SURVEILLANCE SYSTEM

[75] Inventors: Marc Chomet, East Northport; Donald E. Ellison, Sea Cliff, both of N.Y.

[73] Assignee: Sanders Associates Inc., Nashua, N.H.

[22] Filed: June 21, 1972

[21] Appl. No.: 265,105

[52] U.S. Cl. ........................... 178/6.8, 178/DIG. 33
[51] Int. Cl. ........................................... H04n 7/18
[58] Field of Search .............. 178/DIG. 33, DIG. 37, 178/DIG. 38, 6.8; 340/258 B, 258 R

[56] References Cited

UNITED STATES PATENTS 3,603,729 9/1971 Sperber ........................ 178/DIG. 33
3,580,997 5/1971 Webb et al. ................. 178/DIG. 37
2,597,636 5/1952 Hall et al. .................... 178/DIG. 33

*Primary Examiner*—Benedict V. Safourek
*Assistant Examiner*—Joseph A. Orsino, Jr.
*Attorney*—Louis Etlinger

[57] ABSTRACT

A surveillance system is described in which a television camera views the general scene under surveillance and in which the magnitude of the video signal pertaining to a preselected portion thereof and occurring during one or more fields is stored and compared with a reference signal or with the magnitude of the video signal pertaining to the same preselected portion and occurring during one or more subsequent fields, whereby, in either case, a difference in magnitude in excess of a predetermined threshold is indicative of the motion of an object in such portion.

7 Claims, 2 Drawing Figures

TELEVISION SURVEILLANCE SYSTEM

FIELD OF THE INVENTION

This invention relates generally to apparatus for detecting the motion of an object within an area to be protected and particularly to such apparatus in which a camera scans the area and triggers an alarm in response to changes in the nature of the images viewed from time to time.

BACKGROUND OF THE INVENTION

Various schemes have been proposed in the past for detecting the presence of moving objects within an area under surveillance. For example, in radar systems "moving target indicators" have been proposed in which signals obtained during one scan, or frame, have been stored temporarily and compared with like signals obtained during a subsequent scan or frame. Any change in the two signals is indicative of the motion of a target within such area. As another example, it has been proposed to scan the area with a television camera and to store the video signal for an entire frame and to compare the stored signal line by line with the video signal generated during a subsequent frame so as to detect any difference therebetween. Such a system is illustrated in the U.S. Pat. to Kartchner No. 3,531,588. As another example, it has been proposed to view the area under surveillance with a television camera and to divide the resulting video signal into two parts substantially along the center of each horizontal line. The signals representing the left and right halves of each frame are compared and balanced. An intrusion into one half upsets the balance. Such a system is illustrated in the U.S. Pat. to Burney No. 3,488,436. These and other systems, although operative have been subject to a numer of disadvantages. Some have required complex and expensive apparatus for storing and comparing the signals. Some have been unsatisfactory because the change in signal due to an intrusion into a small portion of the field of view has been masked by the unchanged signal over the majority of the field of view.

It is a general object of the present invention to provide an improved surveillance system for sensing the movement of an object within a predetermined area.

A more specific object is to provide a surveillance system which is uncomplicated and inexpensive and which is capable of monitoring a portion of, or all of, a predetermined scene.

SUMMARY OF THE INVENTION

Briefly stated, a surveillance system incorporating the present invention utilizes a television camera and examines the magnitude of that portion of the video signal pertaining to a selected portion of the scene viewed which occurs during one field or frame with a reference signal or with the mgnitude of a like portion occurring during a subsequent field or frame. Any change above a predetermined threshold is indicative of the motion of an object with that preselected portion.

DESCRIPTION OF PREFERRED EMBODIMENT

For a clearer understanding of the invention, reference may be made to the following detailed descriptions on the accompanying drawings, in which.

Figure 1:
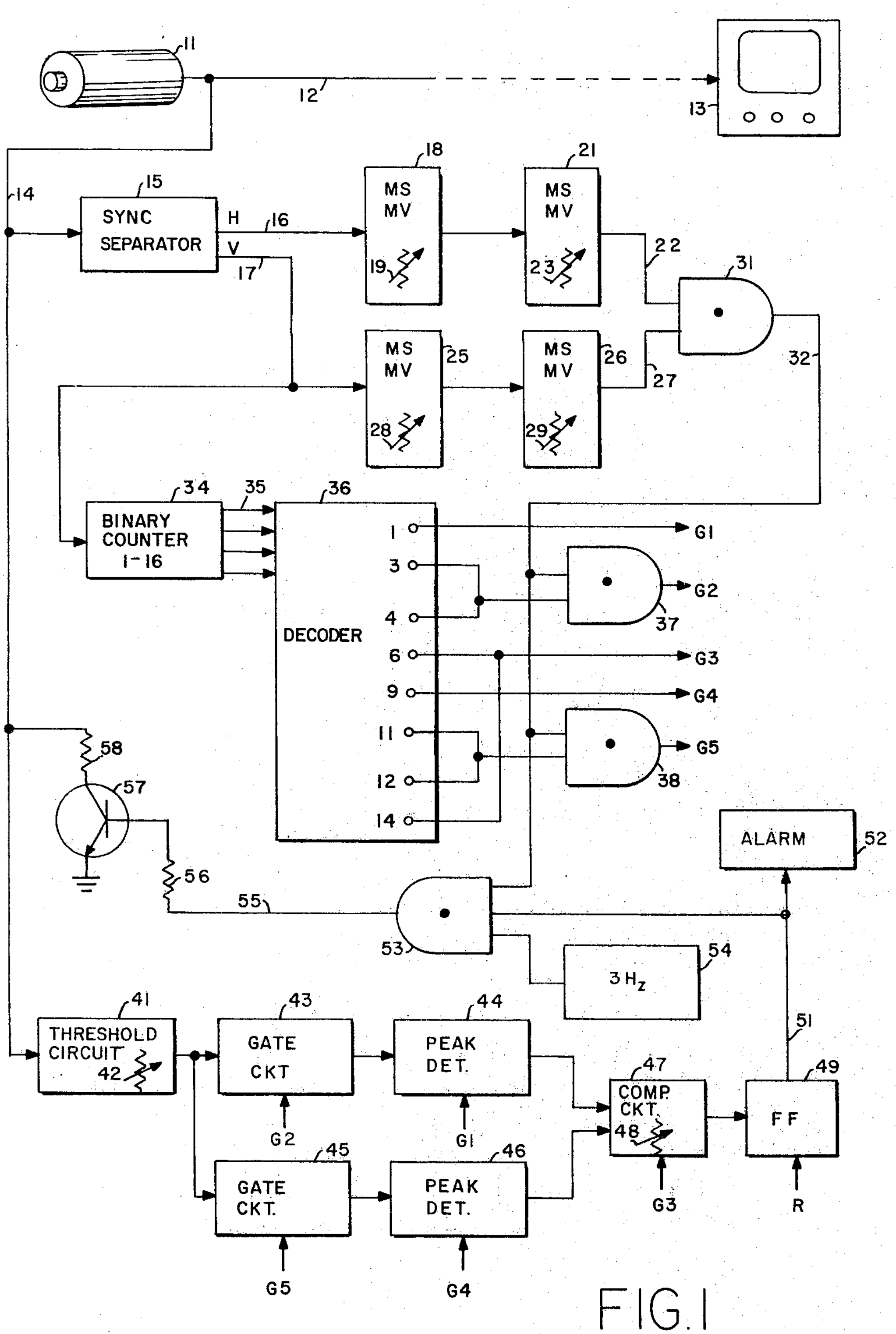
FIG. 1 is a schematic diagram of a preferred form of the invention.

Referring first to FIG. 1, a television camera 11 is connected by means of a communication channel 12 to a monitor 13. This showing is schematic and it is assumed that the camera 11 includes the necessary power supplies, waveform generators and control circuits to generate a suitable video signal along with the usual synchronizing pulses. The camera 11, channel 12 and monitor 13 may be a part of a pre-existing closed circuit television system and the camera 11 may be positioned to view any scene which includes the area to be protected.

The video signal on Channel 12 is sampled via a cable 14 which is connected to, among other things, a synchronizing signal separator 15 which separates the horizontal and vertical synchronizing signals from the remainder of the video signal and from each other and delivers them to conductors 16 and 17 respectively. Each horizontal pulse on conductor 16 triggers a mono-stable (or one shot) multivibrator 18 from its stable to its unstable state thus initiating a pulse. It returns to its stable state thereby terminating the pulse after a time which may be adjusted by the control 19. The trailing edge of the pulse triggers another monostable multivibrator 21 thus initiating another pulse which appears on conductors 22 and the length of which may be adjusted by the control 23. The latter pulse is but one of a series, one of which occurs during each horizontal line. The leading edge may be positioned anywhere on the line by adjusting the control 19 while the trailing edge may be positioned at any subsequent position by adjusting the control 23.

The conductor 17 is connected to actuate a similar pair of monostable multivibrators 25 and 26 similarly connected so as to generate, on conductor 27, a series of pulses one of which occurs during each field, that is, during the period between successive vertical pulses, the leading edge of which may be adjusted by the control 28 and the trailing edge of which may be adjusted by the control 29. The conductors 22 and 27 are connected to the inputs of an AND circuit 31, which, in effect, permits passage of only those pulses on conductor 22 which occur during a pulse on conductor 27. The result is a series of pulses on conductor 32 which collectively define the time during which a preselected rectangular portion of the scene viewed is being scanned. This period of time, and the rectangular area corresponding thereto, are referred to as the window and/or the area to be protected. By means of the previously mentioned adjustments, the window can be made to occupy any rectangular portion of the scene up to and including the entire area thereof.

The conductor 17, carrying the vertical synchronizing pulses, is also connected to a conventional binary counter 34 which, in response to the leading edge of each input pulse, generates successive binary number signals from 0000 to 1111 on its four output conductors 35. These signals are applied to a decoder 36 which may be a standard "one of 16" decoder which places a voltage on sixteen conductors successively and repeatedly as the input count goes from 0000 to 1111 repeatedly. The decoder may also be a more limited one since, in the present apparatus, less than all the outputs are used. These outputs are the basic timing waveforms which control and coordinate the operation of the apparatus. In FIG. 1, only those outputs actually used are shown, namely those outputs occurring during the first, third, fourth, sixth, ninth, 11th, 12th, and 14th counts. The output occurring during the first count starts at the beginning of the first field and ends at the beginning of the second field and is designated "Gate 1" or G1. The outputs occurring during the third and fourth counts correspond to the third and fourth fields, respectively, and are combined to form a wider pulse and are applied to one input of an AND gate 37 the other input of which is the window signal on conductor 32. The result is Gate 2 which represents the time during which the window is being scanned during the third and fourth fields. The outputs during fields six and 14 are combined to form Gate 3. The output during field nine is Gate 4. The outputs during fields eleven and twelve are combined and connected to an AND gate 38, the other input of which is the window signal, to generate Gate 5. Each gate lasts for a time corresponding to one field or an integral multiple thereof. Gates one to five are applied to the apparatus where indicated by their respective symbols for purposes to be explained.

The video signal on conductor 14 is also applied to a threshold circuit 41 which passes only those portions of the video signal which exceed a predetermined magnitude as determined by the setting of a control 42. The output of the circuit 41 is connected to a gate circuit 43 which is enabled, or opened, only during Gate 2. The output of gate circuit 43 is connected to a peak detector 44 which delivers an output indicative of the peak magnitude of the signal applied thereto. The peak detector 44 is reset, or returned to zero (as by discharging a capacitor) during Gate 1 so as to be ready for a new determination.

The output of the threshold circuit 41 is also connected to a gate circuit 45, similar to the circuit 43, which is opened only during Gate 5. The output of this gate is connected to the input of a peak detector 46, similar to the detector 44, which is reset or returned to zero during Gate 4. The outputs of the peak detectors 44 and 46 are connected to the inputs of a comparison circuit 47 which, during Gate 3, compares the two peak magnitudes and, if they differ by an amount in excess of a threshold determined by the adjustment of a control 48, delivers an output signal to a flip flop circuit 49.

In operation, Gate 1 is applied to the peak detector 44 to return it to zero. During Gate 2 (fields 3 and 4) the video signal is applied to detector 44 which generates and stores a signal indicative of the peak value thereof. Next, during gate 3 (field 6), the comparator 47 is enabled and compares the signals stored in circuits 44 and 46. If their difference does not exceed the threshold, there is no output. Next during Gate 4, the circuit 46 is returned to zero. During Gate 5, the video signal is applied to peak detector 46. Next, during Gate 3 (field 14) the circuit 47 again compares the signals stored in the circuits 44 and 46 and, if their difference does not exceed the threshold, the cycle is repeated with the return to zero of circuit 44. Thus, assuming the United States commercial broadcasting signal standard of interlaced scanning with two fields per frame, 30 frames and 60 fields per second, there is a complete cycle, every 16 fields or approximately four times per second.

When the circuit 47 detects a difference in excess of the threshold, a signal indicative thereof is passed to the flip flop circuit 49 to change its state. Such change appears as a warning signal on conductor 51 which is connected so as to actuate any suitable alarm device 52. The alarm continues in operation until the flip flop circuit 49 is reset, either manually or automatically.

The warning signal on conductor 51 is also connected to one input of an AND circuit 53 another input of which is the window circuit of conductor 32 and a third input of which is taken from a source 54 of alternating current signal of about 3 or 4 hertz. The output of the AND circuit 53 on conductor 55 is connected through a resistor 56 to the base of an NPN transistor 57 the emitter of which is grounded and the collector of which is connected through a resistor 58 to conductor 14, which, it will be recalled, is in turn connected to the communication channel 12 carrying the video signal. The signal on conductor 55 occurs only during the window and only when an alarm signal is present and fluctuates at the rate of 3 hertz, thereby rendering the transistor 57 conductive and nonconductive alternately which in turn attenuates the video signal at the same rate and causes the image of the window on the monitor 13 to blink.

Figure 2:
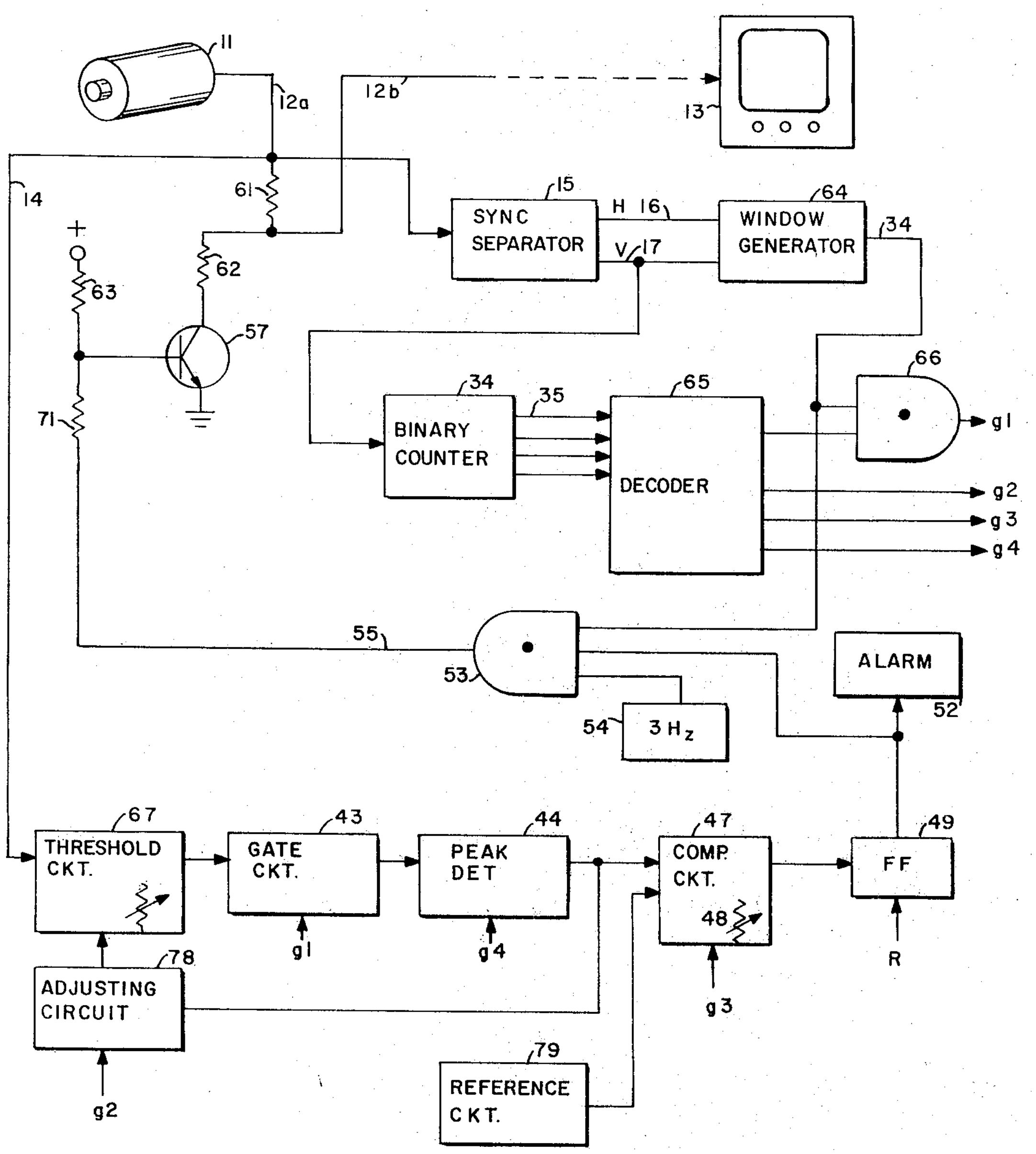
FIG. 2 is a schematic diagram of a modified form of the invention.

Another embodiment of the invention is shown in FIG. 2. Many of the components are identical to those of FIG. 1 and have been denoted by the same reference characters. The communication channel between the television camera 11 and the monitor 13 is divided into two parts **12*a* and 12*b* interconnected by a resistor 61. The terminal of the resistor 61 remote from the camera 11 is connected through another resistor 62 to the collector of the NPN transistor 57, the emitter of which is grounded. The base of the transistor 57 is connected to the junction of resistors 63 and 71, the former being connected to a source of positive potential and the latter being connected through the conductor 55 to the outputs of the AND circuit 53. In the absence of an alarm signal, the conductor 55 is at a potential low enough to hold the transistor 57 nonconductive so that the voltage divider comprising resistors 61 and 62 and the transistor 57 is ineffective with the result that the video signal transmitted from the camera 11 to the monitor 13** is substantially unattenuated.

The communication channel 12a is connected to the sync separator 15 as before so that the output on conductors 16 and 17 represents the horizontal and vertical synchronizing pulses respectively. These two conductors are connected as before in order to generate a window signal on the conductor 32. The various components of FIG. 1 have been denoted collectively by the reference character 64 in FIG. 2. The conductor 17 is also connected to the binary counter 34 as before, which in turn is connected to a decoder 65. This decoder is similar to the decoder 36 of FIG. 1 and may comprise a one of 16 decoder of which only certain terminals are used or may comprise a simple arrangement of fewer components. In any event, the decoder 65 generates four timing waveforms, the repetitive pulses of which are spread approximately evenly over the time for 16 fields. The first output is connected to one terminal of an AND gate 66, the other terminal of which is connected to the conductor 32. This output is gate 1 (g 1) and occurs only during the window. The remaining outputs constitute gates g 2, g 3, and g 4. The gates are connected to the remainder of components as indicated by the application of these designations to the particular compenents affected.

The video signal on conductor 14 is connected to a threshold circuit 67 which is similar to the circuit 41 of FIG. 1 but which in addition can be compensated automatically for slow changes in video signal level caused, for example, by gradual changes in the level of illumination. The threshold circuit 67 is connected as before through the gate 43 to the peak detector 44 which in turn is connected to the comparison circuit 47. The output of the peak detector 44 is also connected to an adjusting circuit 78 which, during the gate g2, automatically adjusts the setting of the threshold circuit 67 in small increments to compensate for slow changes in the level of the output of peak detector 44. A reference circuit 79 furnishes a low impedance source of a constant voltage signal to the comparator circuit 47 and serves as a reference against which the output of peak detector 44 is compared.

In operation, the first gate g1 enables or opens the gate circuit 43 so that the video signal from conductor 14, as limited or modified by the threshold circuit 67, is applied to the peak detector during the gate g 1. During the gate g 2, the adjusting circuit 78 is enabled, and, if necessary, adjusts the circuit 67 by a small increment. During the gate g 3, the comparison circuit 47 is enabled and the output of peak detector 44 is compared with the reference voltage from the reference circuit 79. Assuming for the moment that the difference in values is insufficient to constitute an alarm, the cycle continues. Gate g4 resets the peak detector to zero so as to be ready for a new comparison.

Assuming that the output of the comparator circuit 68 indicates a substantial change in video signal level, the flip flop 49 is triggered thereby putting an alarm signal on the conductor 51. This signal is sent to the alarm 52 and also passed through the AND circuit 53 as before, to the conductor 55. The conductor 55, it will be recalled, is connected through the resistor 71 to the base of the transistor 57. As in the case of FIG. 1, the signal on conductor 55 appears only during the window period, only if an alarm signal is present, and if further modulated by the 3 hertz signal from the source 54. This signal causes the transistor 57 to be rendered conductive during the window period once each cycle of the source 54. The result is that the video signal to the monitor 13 is attenuated at this time causing the window on the monitor 13 to be darkened thereby indicating visually the presence of an intruder by the "blinking" of the window.

From the foregoing it will be apparent that applicant has provided a novel and simple surveillance system. It is readily adaptable to existing closed circuit televisions and can be attached to them without interrupting their normal use in any way. Surveillance can be pinpointed to any particular critical area, such as a cash register, or can be made more general, all by adjusting the size of the window 32. The entire apparatus is inexpensive because standard, non-critical, readily available components are used throughout.

It is to be noted that in both FIGS. 1 and 2, the video signal for two successive fields (one frame) has been selected as a basic unit of time during which the video signal is sampled. It may be more advantageous in some cases to use one, or more, such as four fields, which can be done easily by simple selection of gate widths. It is also to be noted that a 3 hertz source has been illustrated to cause the window to blink. A suitable blinking signal could alternatively be taken from the most significent output conductor at the counter 34 which, although not exactly 3 hertz, would be satisfactory.

Although some specific embodiments of the invention have been described in considerable detail for illustrative purposes, many modifications will occur to those skilled in the art. It is therefore desired that the protection afforded by Letters Patent be limited only by the true scope of the appended claims.

What is claimed is:

1. A surveillance system including a closed circuit television arrangement having a camera viewing a scene which includes the area to be protected and having a monitor for displaying an image of the scene viewed by said camera, said system including means for separating the horizontal and vertical synchronizing signals from the video signals generated by said camera, first means responsive to said synchronizing signals for generating a window signal indicative of that portion of the time during each field that a preselected rectangular fraction thereof is being scanned, and second means responsive to said synchronizing signals for generating timing waveforms, characterized in that said second means comprises a binary counter operated by said vertical synchronizing signals for generating repeatedly a series of successive binary number signals from zero to its capacity and also comprises a decoder operated by said binary number signals for generating a plurality of repetitive series of voltage pulses on a like plurality of output conductors, each of said series having a duration approximately equal to the duration of an integral multiple of fields, and in that said system includes a peak detector for detecting and storing the peak magnitude of a video signal applied thereto, means controlled by said timing waveforms and said window signal for applying that portion of the video signal occurring during the time defined by said window signal and one of said series of pulses to said peak detector, means for generating a reference signal, means enabled by one of said waveforms for comparing the magnitudes of the signal stored by said peak detector and said reference signal, and means responsive to a difference in said magnitudes in excess of a predetermined threshold for generating a warning signal.

2. A surveillance system in accordance with claim 1 in which said means for generating a reference signal comprises a second peak detector for detecting and storing the peak magnitude of a video signal applied thereto and also comprises second means controlled by said timing waveforms and said window signal for applying that portion of the video signal occurring during the time defined by said window signal and another one of said series of pulses to said second peak detector.

3. A surveillance system in accordance with claim 1 which includes means for adjusting the size and location of said preselected rectangular fraction.

4. A surveillance system in accordance with claim 1 which includes means responsive to said warning signal for varying the magnitude of that portion of said video signal which occurs during said preselected rectangular fraction of each field.

5. A surveillance system in accordance with claim 1 in which said means for generating a reference signal comprises a circuit for furnishing a constant voltage signal.

6. A surveillance system in accordance with claim 5 which includes a threshold circuit for limiting the video signal passed to said peak detector to those portions which exceed a predetermined magnitude.

7. A surveillance system in accordance with claim 6 which includes an adjusting circuit responsive to slow changes in the level of the output of said peak detector for adjusting the predetermined magnitude of the signals passed by said threshold circuit.

* * * * *